Figure 1:
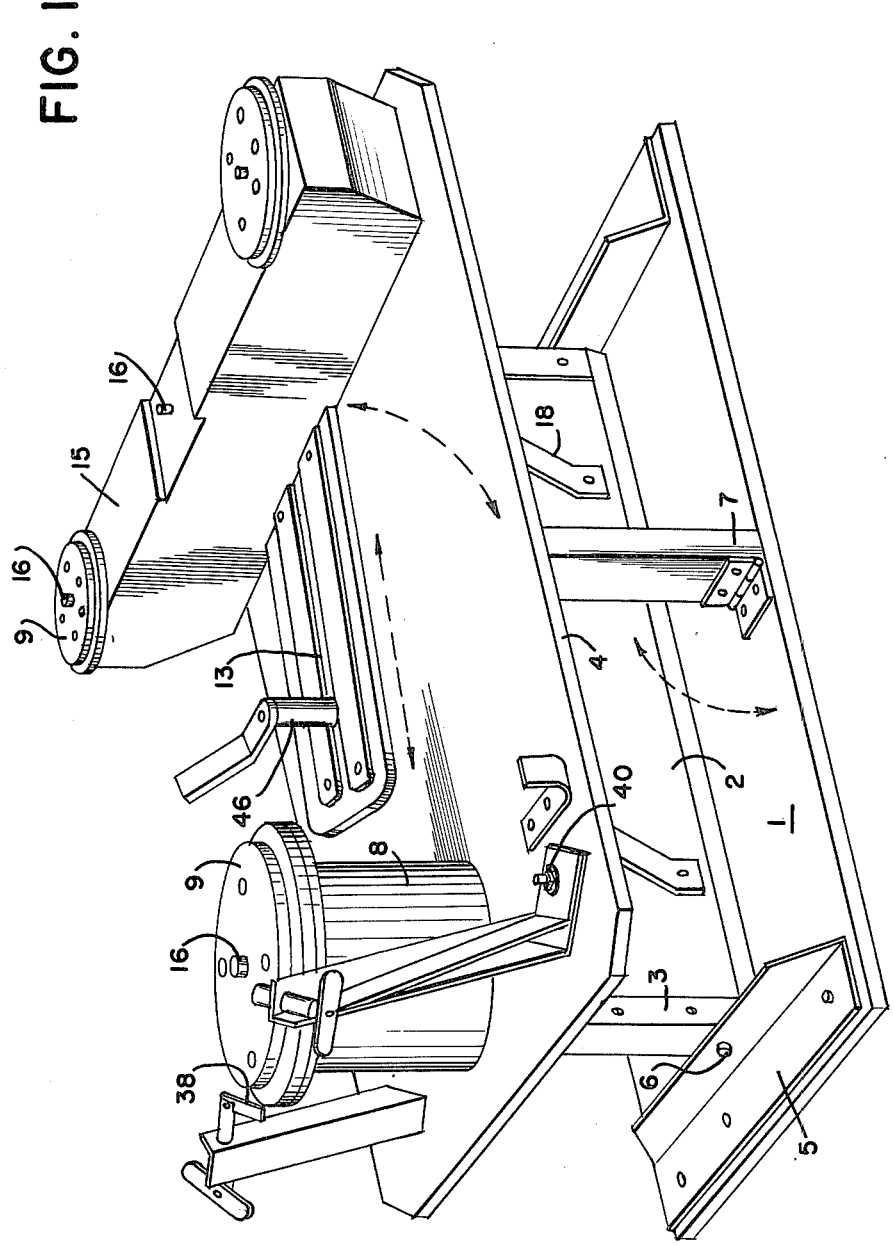

United States Patent [19]

Dudley

[11] 4,193,326
[45] Mar. 18, 1980

[54] HOLDING APPARATUS FOR SHARPENING CHAIN SAWS

[76] Inventor: Alex Dudley, 220 Edgewood Rd., Lansing, Mich. 48910

[21] Appl. No.: 827,789

[22] Filed: Feb. 23, 1978

[51] Int. Cl.² ............................................. B23D 63/16
[52] U.S. Cl. ..................................... 76/74; 76/25 A; 76/40
[58] Field of Search ................. 76/25 A, 40, 74, 78 R

[56] References Cited

U.S. PATENT DOCUMENTS

| | | | |
|---|---|---|---|
| 1,436,485 | 11/1922 | De Wijs | 76/74 |
| 2,405,365 | 8/1946 | Myers | 76/25 A |
| 2,501,498 | 3/1950 | Collis | 76/25 A |
| 3,006,222 | 10/1961 | McEwan | 76/25 A |
| 3,717,051 | 2/1973 | Silvey | 76/25 A |
| 4,016,781 | 4/1977 | Dudley | 76/40 |
| 4,040,314 | 8/1977 | Geeck | 76/78 R |
| 4,120,215 | 10/1978 | Kaye | 76/25 A |

FOREIGN PATENT DOCUMENTS 343754  2/1960  Switzerland ............................ 76/25 A Primary Examiner—Nicholas P. Godici

[57] ABSTRACT

A chain saw work holder designed to horizontally support an entire chain saw, and a portable adapter designed to support said work holder securely and removably while balancing a pivotal rocking tool on a vertical plane in close proximity thereto. Said work holder is composed of a base on which is secured an elongated beam supporting a pivotal deck equipped with two risers. Each riser is supplied with pins to receive rotatable races for securing, movably taught, a chain saw of any size or length. A unique channel morticed into the center of the back riser at an eccentric angle, and releasably lockable to said deck, enables said back riser to adjust to any length of saw chain. A hinged block on each side of said base allows the deck to tilt to right or left and combines with the lateral mobility of the work holder on the adapter to orient a cutting link of a chain saw elevationally, angularly, and laterally, to the vertically disposed cutting element of a pivotal rocking tool. An index on each side of the front riser selects and holds each cutting link until sharpened, dropping away and selecting again as the chain is rotated.

2 Claims, 10 Drawing Figures

FIG. 9
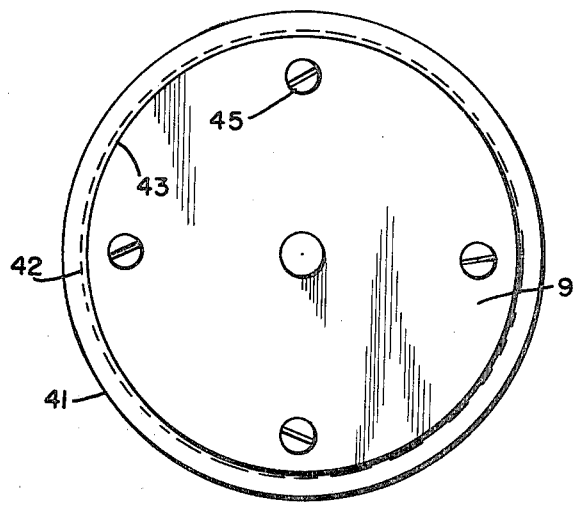
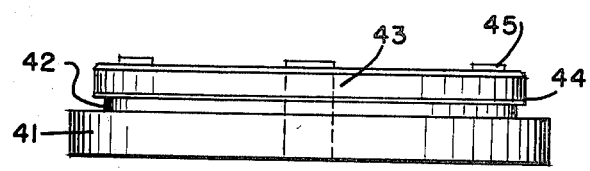
FIG. 10
FIG. 7
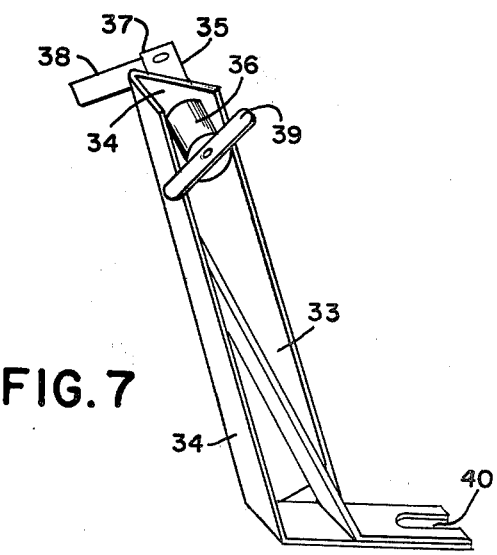
FIG. 8
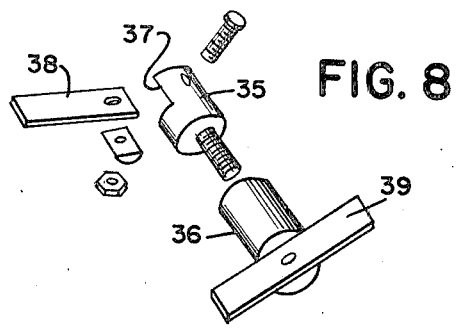

HOLDING APPARATUS FOR SHARPENING CHAIN SAWS

BACKGROUND

There have been many types of manual and mechanical chain saw sharpeners in the past, and similar guides and mountings used before, notably U.S. Pat. Nos. 3,717,051, 3,006,222, 2,405,365, and 343,754; also similar support structures, such as 1,436,485, 2,501,498, 4,040,314, and 4,016,781, the last named being my patent for a Circle Saw Sharpener. The Adapter of the present invention is a portable support structure incorporating all of the elements a work bench requires to accept this and other similar saw work holders, plus a provision for holding a pivotal rocking tool in close proximity to the work holder. Most saw sharpening devices require a separate motor and cutting device for each type of saw; this system eliminates that necessity. All of the above devices, require some type of cam, pulley, spring, lock or latch for stopping, holding, or continuous urging of a portion of a saw chain on and off a holding device, and changing latches or dogs while sharpening. This is time consuming.

Also, those familiar with the art, know it is much less hazardous for an operator to operate a grinding disc from behind it, since a breaking wheel always throws forward; it is also less awkward to rock the cutting element forward into the cutting link, than to rock a cutting link into the cutting element, particularly when each portion of the saw chain must be locked and unlocked as the saw chain is advanced and sharpened. The present invention, though extremely simple, is a very rapid and effective system, and produces a chain saw that is precisely and uniformly ground.

BRIEF DESCRIPTION

Figure 2:
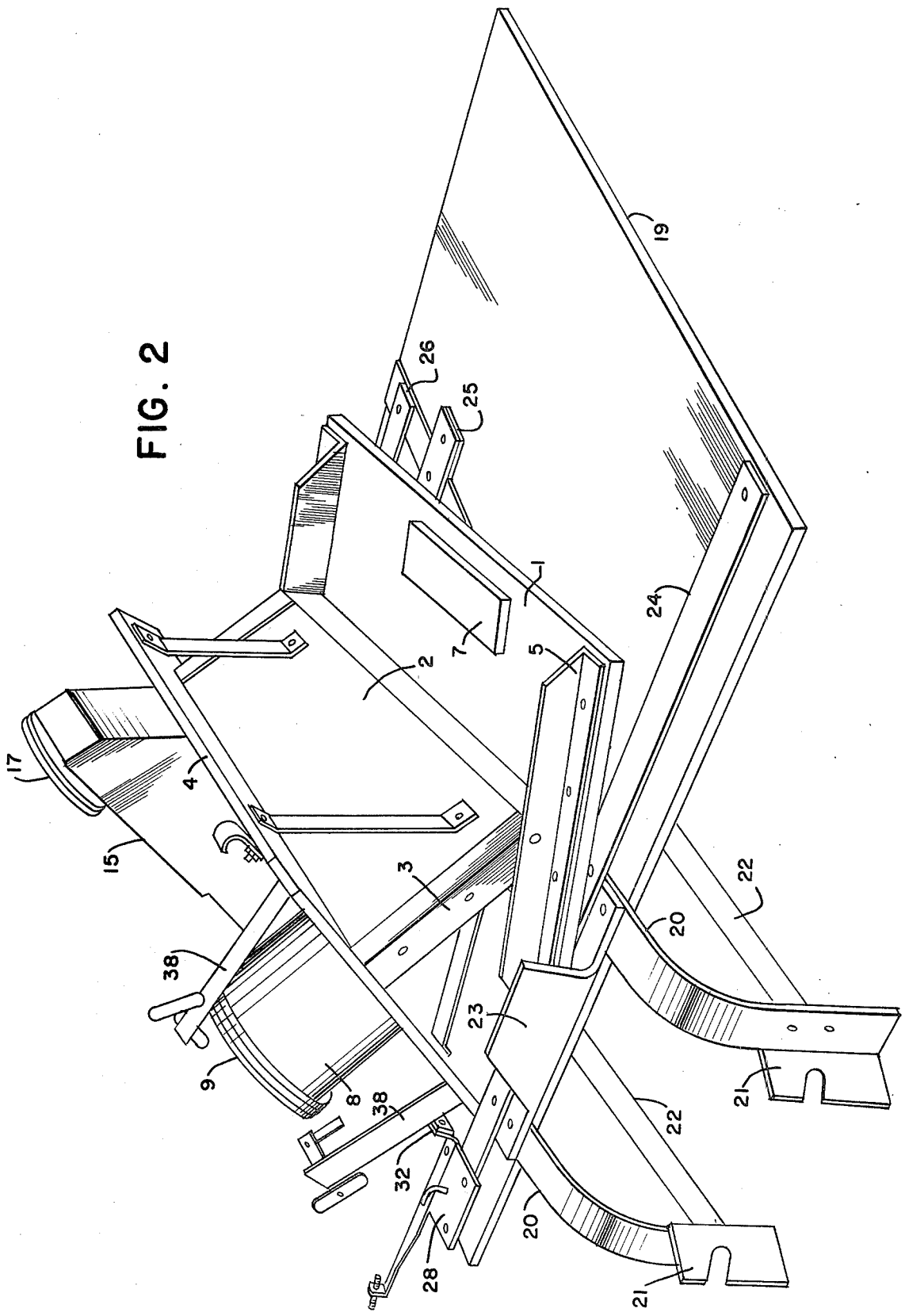
Figure 3:
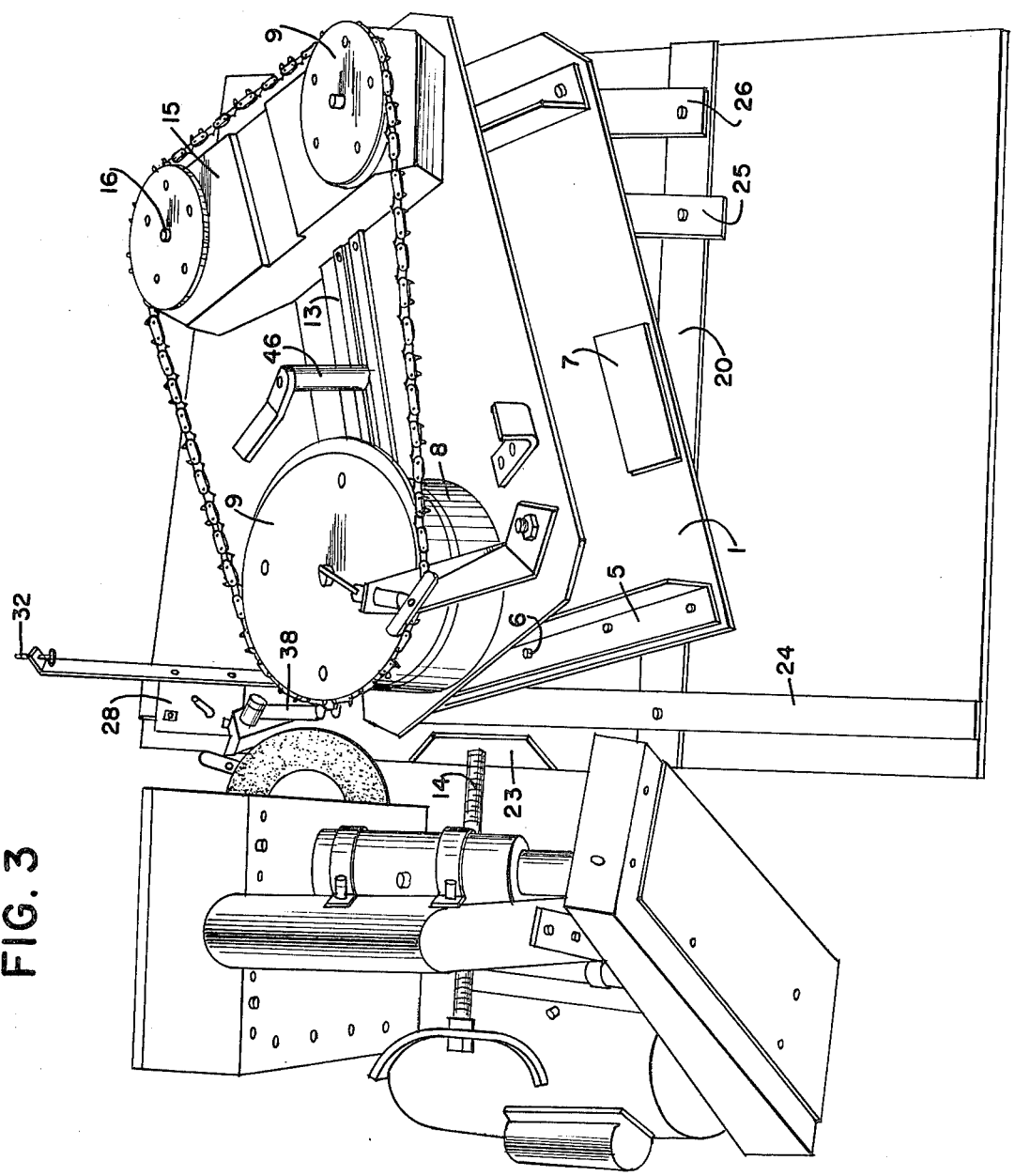
Figure 4:
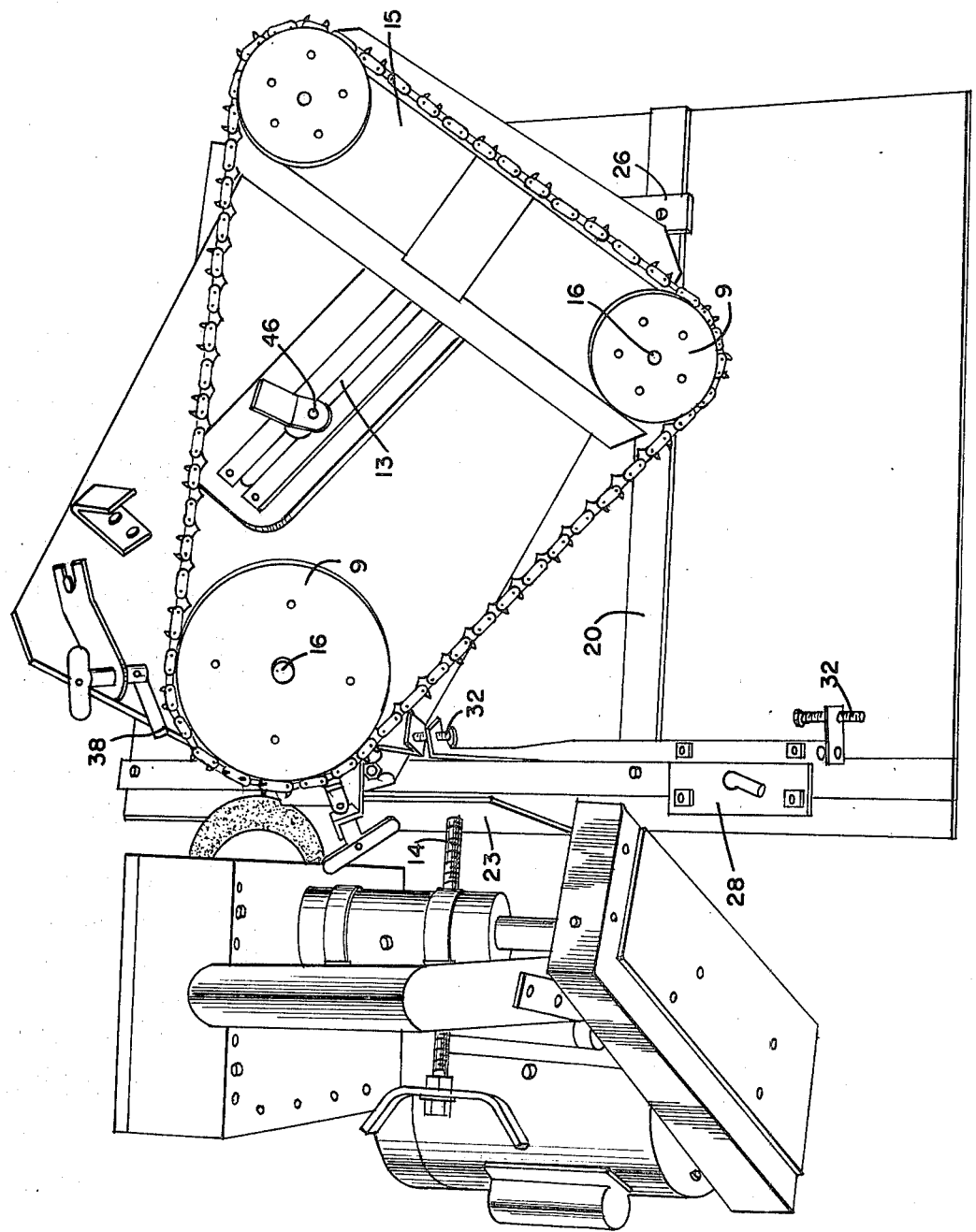
Figure 5:
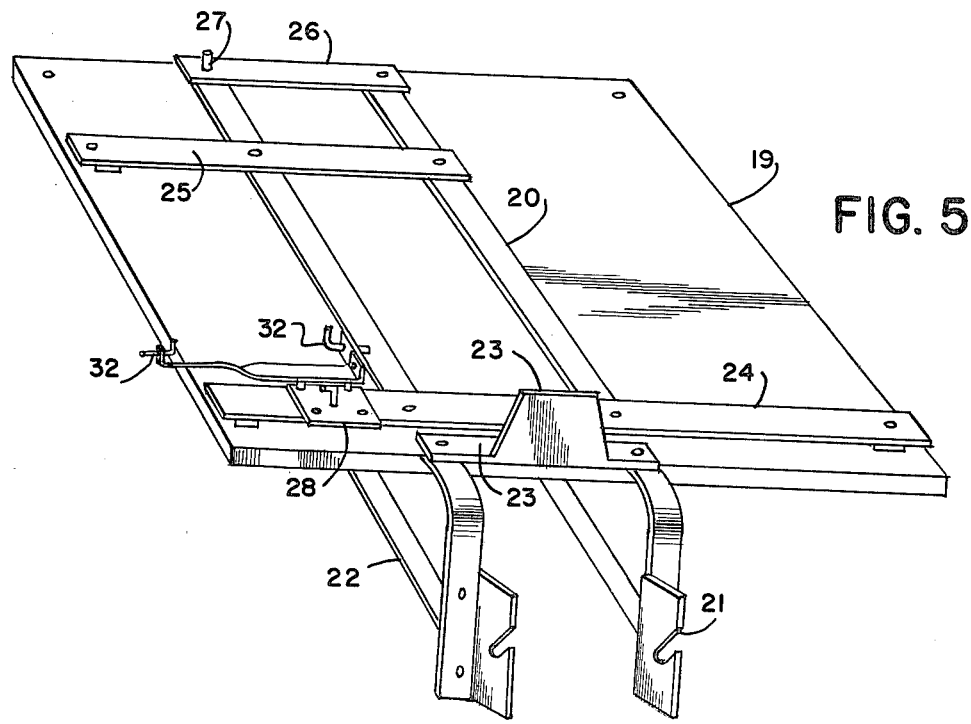
Figure 6:
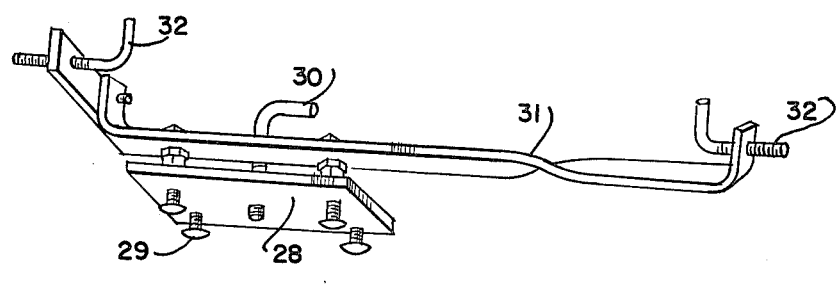

To better understand the present invention, please study the accompanying drawings, in which the preferred embodiment is illustrated with the various parts identified by like reference numbers in each of the views:

FIG. 1 illustrates the various elements and features of the chain saw work holder, while FIG. 2 is an overall view of the present invention showing the holding tool disposed on the adapter and positioned as required for presenting the left-hand cutters of a chain saw to a cutting element, FIG. 3 is a top perspective view of the work holder positioned as in FIG. 2, and in particular relation to the various stops thereon including the stop on a pivotal rocking tool, FIG. 4 is a drawing of the work holder positioned as for sharpening the right-hand cutters, FIGS. 5 and 6 are drawings of the adapter and the stop for maintaining lateral alignment of the work holder on the adapter, FIGS. 7 and 8 illustrate the construction of stop 38 on the deck, while FIGS. 9 and 10 are top and side views of the races on which the chain saw rests.

STRUCTURE AND METHOD OF USE

FIG. 1 illustrates the various elements of the work holder. The rectangular base 1 is bored at the center back to drop over pin 27 shown in FIG. 5; the base 1 supports an elongated riser beam 2, supported by metal angle 5 and metal strip 3 in front and back, said beam being bored in the center front and back to receive a hardened screw pin 6 which extends into the base of the riser and which pins enable the riser 2 to pivot the deck 4 from side to side approximately 40°, since said deck 4 is supported by said riser 2 and riser 2 is secured to deck 4 by two metal brackets on each side. A small hinged block 7 on each side of the base and equidistant from each end of base support the deck in an upright position for applying a saw chain.

FIGS. 1 and 2 illustrate the elements of the deck 4, which deck supports a fixed front riser 8 and a stop 38 adjacent to and on each side of riser 8. There is an elongated back riser 15, into which is morticed at an eccentric angle, a flat, elongated, metal-lined channel 13, which channel allows riser 15 approximately 6" of travel backward, forward, or laterally. An off-set threaded bar nut 46 releasably locks channel 13 in any desired position required for the length of the saw chain.

FIG. 1 also shows the placement of the pins 16 and races 9 on the front and back risers of deck 4. Stop 38 shown in FIG. 1, and the construction of which is shown in FIGS. 7 and 8, is composed of a heavy metal angle 34, supported by a stabilizing angle 33, angled at the base and secured on the deck adjacent to the front riser, at approximately 15° off vertical; elongated slot 40 allows stop 38 to be adjustable as to it's position on the chain saw, and releasably locks the stop in position by bolt and nut. FIG. 8 is a blow-up of the top of stop 38, which is an overhead stop comprising a slotted screw 35 and a formed nut 36; the screw-end 37 is slotted to receive a flat steel flexing blade 38, secured by a lock screw; the formed nut into which the slotted screw 35 fits has a finger tightening winged nut 39 which controls said stop.

Also shown in FIGS. 1 and 2 and in detail on FIGS. 9 and 10, are top and side drawings of the step-lipped races 9, which are laminated, grooved, and steel-lined; the top 43 is secured with four steel screws 45, and center bored to receive pin 16 of the risers. The top of the race engages the driving edge of the chain saw; the base 41 is slightly larger and is grooved to receive the driving edge and provide a shoulder on which the driving links are secured while the cutting links and rakers are exposed.

FIGS. 5 and 6 are detailed drawings of the adapter and the slidable stop 28. The adapter is a network of latitudinal and longitudinal strips on a portable base 19. The pin 27 on horizontal angle 26 provides a means of securing the work holder while allowing it to swing freely laterally. The two longitudinal angles 20 curve outwardly and downwardly to form a saddle 21, composed of a 2×3" angle on each strip 20, each bored in the center and angling upwardly at a 10° angle to form a secure saddle approximately 1" deep and ½" wide in which the rocker arm of a pivotal rocking tool rests. The plate 23 of the adapter, against which the rocking tool is stopped, is a 3" angle. Since the rocker arm of said tool now rides in the saddle of the adapter, the stop 14 of said tool which was just above the motor, is now above the rocker arm, enabling it to be adjusted against plate 23 of the adapter.

Stop 38, shown in FIG. 5 and detailed in FIG. 6, is a slidable stop, composed of a small threaded bar 28, through which four bolts 29 are affixed to an elongated metal strip 31 in such a way as to enable stop 28 to slide onto either end of latitudinal strip 24, and be secured in position by clamping means; screws 32 on each end of strip 31 are adjustable against the deck of the work holder in it's tilted position, thus maintaining lateral alignment of the work holder and gauging the amount of cut desired.

In using, the operator places the work holder over pin 27 on latitudinal strip 26 of the adapter; the hinged blocks 7 maintain the deck in an upright position while the chain saw is applied to the races 9; the back riser 15, is adjusted on the deck according to the length of the chain saw, and secured in position by bolt 46 in the elongated channel 13. The operator then releases the blocks 7, allowing the deck to be tilted to the left for the left-hand cutters, bringing the cutters to the proper elevation; then, swinging the entire work holder to the right on the adapter, the operator brings the cutters in exact lateral alignment with the vertically disposed cutting element of a pivotal rocking tool, and slides stop 28 onto the front latitudinal strip, on the left side, and locks the deck in it's lateral position. At this time, the pivotal rocking tool, which rests at about 10° off vertical in saddle 21, is brought forward to determine the root diameter of the cutting link, and stop 14 is set against plate 23, preventing further forward progress of the cutting element; also at this time, screw 32 on stop 28 is adjusted for the exact amount of cut required to sharpen the cutting links to a precise edge. This set-up is quickly accomplished and nothing further is required until all the left-hand cutters are sharpened. The operator rotates the chain saw counter-clockwise; the left-hand stop 38, being set, indexes on the heel of each cutter in sequence, holding it until sharpened, releasing each link as the chain is rotated, until all the left-hand cutters are sharpened. The pivotal rocking tool returns to it's position at 10° off vertical automatically when released, producing an easy, rapid, synchronized action. After the left-hand cutters are sharpened, the metal flexing blade 38 is flipped up; the stop 14 is adjusted to change the cutting element from the root diameter to the outside diameter of the cutting link, and the chain is quickly rotated, lightly touching the rakers, taking off from 0.015 to 0.020, as desired to return the chain to it's original uniformly sharpened condition. Restoring the deck to it's upright position by again securing the hinged blocks, the chain saw is quickly turned over, all positions are reversed for the right-hand cutters, and the process is repeated, with the operator now rotating the chain saw in a clockwise manner.

In the present invention, it can be appreciated that I have eliminated many of the time consuming elements usually required to set up and sharpen a chain saw. The set-up is simple, the sharpening is accomplished in a minimum of time, and the result is a chain saw which is precisely and uniformly sharpened with a minimum of time and effort.

What is claimed as invention is:

1. An adapter for supporting a chain saw work holder, said adapter being composed of three latitudinal strips secured to two longitudinal strips, and secured on a base, means for removably securing a work holder on said adapter, said means being a pin on the far latitudinal strip of said adapter, means for removably securing a freely swinging pivotal rocking tool on said adapter, said means being the two longitudinal strips, which strips extend beyond the base at the front of said adapter, curving outwardly and downwardly, each having affixed an angle, said angles being bored in the center and angling upward at a 10° angle, leaving an opening, forming a saddle to receive the rocker arm of a pivotal rocking tool, means for stopping further forward movement of a pivotal rocking tool after determining the root diameter of a cutting link, said means being an angle affixed to the center front of said adapter, means for removably securing said adapter to any bench or table, said means being a strip secured behind each saddle and extending backwardly therefrom sufficiently to be secured by bolts to any bench.

2. A chain saw adapter, according to claim 1, in combination with a chain saw work holder, including, a chain saw supporting structure comprising a rectangular base provided at the far end with means for securing said base over a pin on said adapter, thus leaving said base free to swing on said adapter to any lateral position required for engagement of a cutting link by a cutting element, means for securing said base against further lateral movement after alignment of a cutting link with a cutting element, said means being a slidable stop composed of a threaded bar affixed to an elongated strip in such a way as to enable said stop to slide onto either end of the latitudinal strip at front of said adapter, said stop being secured by clamping means, means for gauging the amount of cut desired, said means being an adjustable screw on each end of said elongated strip and adjustable against a deck of said work holder in it's tilted position, means for pivotally supporting said deck above said rectangular base, said means being an elongated beam secured by angles and strips to said base, and by brackets, two on each side, securing said deck to said beam, said beam thereafter pivoting by means of a hardened screw pin received in each end of said beam through said back and front supporting angles, allowing said beam to tilt 40° to either right or left, thus orienting a horizontally disposed chain saw on said deck, both angularly and elevationally, to a vertically disposed cutting element, means for maintaining said deck in an upright position for placement of a chain saw, said means being a small hinged block on each side of said base and equidistant from each end, a fixed riser on the front of said deck, and a movable back riser, provide means for mounting a plurality of step-lipped, steel-lined, grooved races on a series of pins received by said risers; said races being freely rotatable and grooved to secure the driving edge of a chain saw, providing a shoulder for said driving edge, and exposing only the cutting links and rakers, means for maintaining said chain saw in said races, said means being a flat, elongated, steel-lined channel, morticed into the center base of said back riser at an eccentric angle, and allowing travel of said back riser backward, forward, or laterally, according to the length of saw chain, and means for releasably locking said back riser in any desired position in which said chain saw is rotatably taught, said means being an off-set threaded bar nut which is releasably tightened over a bolt received through said deck and said channel, means for indexing on the heel of each cutting link, said means being a stop on each side of said deck and adjacent to said front riser, said stop being mounted on a metal angle, angled at the base and secured at approximately 15° off vertical on said deck and releasably locked by bolt and nut in an elongated slot on said deck; said stop comprises a slotted screw and a formed nut; the screw-end is slotted to receive a flat flexing blade secured by a lock screw; a finger tightening winged nut locking said blade to said angle.

* * * * *